United States Patent Office 2,997,446
Patented Aug. 22, 1961

2,997,446
METHOD OF PRODUCING ELECTROLUMINESCENT ALUMINUM NITRIDE
Irving Adams, Cranford, and Guenter A. Wolff, Little Silver, N.J., assignors to the United States of America as represented by the Secretary of the Army
No Drawing. Filed Feb. 16, 1959, Ser. No. 793,646
13 Claims. (Cl. 252—301.4)
(Granted under Title 35, U.S. Code (1952), sec. 266)

The invention described herein may be manufactured and used by or for the Government for governmental purposes without the payment of any royalty thereon.

This invention relates to a method of producing aluminum nitride (AlN) of high electroluminescent properties.

Electroluminescence, that is, the production of sustained luminescence in a previously unexcited phosphor by application of an electric field has been observed in BN, GaP, Ga (P, As) and (Ga, In) P. Other compounds composed of elements from the groups III$b$ and V$b$ of the periodic table (hereinafter called "III–V Compounds") show similar effects but as far as AlN is concerned its electroluminescence in the visible range has been found to be very weak. In fact, pure crystals of AlN obtained by sublimation are found to be neither fluorescent nor phosphorescent nor electroluminescent.

It now has been found that aluminum nitride of strong electroluminescent properties can be made by purifying a crystalline AlN in a halogen gas (preferably chlorine) at temperatures of between about 300 to 1500° C. for a relatively short period of time (e.g., about five minutes), doping the purified crystalline AlN with an excess of a doping agent capable of imparting to the crystalline AlN luminescent properties and again heating the doped AlN in the presence of a halogen gas at temperatures of between about 300 to 1500° C.

During the period of heating at temperatures of 300 to 1500° C. most of the impurities which are volatile at that temperature or which form volatile chlorides with chlorine gas at that temperature are removed. It is particularly necessary to remove the excess of metallic aluminum in the crystalline AlN because if the metallic aluminum were not removed it would impair the dielectric property of the aluminum nitride by providing electrically conductive paths through the AlN.

The exact percentage in which the doping agent actually combines with the AlN nitride is not known and cannot be determined accurately by analysis since it appears impossible to determine just how much of the doping agent present is actually causing the electroluminescence and how much is present as inert impurity. Expressed differently, it cannot be determined analytically how much of the substance added as doping agent consists of the desired or significant impurity and how much of it is either inert or constitutes even an undesired, impairing impurity. Generally, it may be stated that an electroluminescent AlN may contain about 2% or less significant impurities but it should be noted that some doping agents may be present in extremely small amounts such as 10–7%.

The present invention obviates the necessity of determining in advance the exact amount of significant impurities that make the crystalline AlN electroluminescent by choosing an amount of doping agent slightly above the probable amount that is necessary to obtain optimum electroluminescence, incorporating this excess amount in the purified aluminum nitride and removing the excess doping agent by another purification process with $Cl_2$ at high temperature.

Doping agents for AlN are, for instance, magnesium, and its compounds such as magnesium chloride ($MgCl_2$), magnesium oxalate ($MgC_2O_4$), magnesium oxide (MgO), etc., manganese and its compounds, such as manganese chloride ($MnCl_2$), manganese dioxide ($MnO_2$), manganese oxalate ($MnC_2O_4$), etc., chromium and its compounds, such as, chromium trichloride ($CrCl_3$), chromium oxide ($Cr_2O_3$), chromium oxalate ($CrC_2O_4$), etc. Other elements from group II, such as Be, Zn, and Cd and their compounds and elements from group I, such as, Cu and Ag, and their compounds, and elements of group IV, such as, C, Si, Ge, Sn and Pb and their compounds may also be used, as well as Fe, Co, Ni and S and their compounds.

The invention will become more apparent from the following specific examples:

*Example 1*

Crystalline AlN is first prepared by placing 1 gram of pure powdered aluminum (99.99% purity or better) in an Alundum thimble or crucible about 2″ high and ½″ wide. This crucible is placed inside a tungsten coil and supported by a tantalum plate. This assembly is placed in a stainless steel bomb, 12″ high and 3″ wide with ½″ walls. Dry nitrogen of highest purity from a nitrogen cylinder is passed into the bomb until a pressure of about 270 to 300 p.s.i. is attained. The tungsten heating element is heated by passing 100 amperes of current through it. The bomb is maintained at about 2000° C. for ten minutes, then allowed to cool after which the bomb is opened and disassembled.

The resulting crystalline AlN powder is now purified by passing a halogen gas over it at temperatures of about 800° C. The gas can be $Cl_2$, $Br_2$ or $I_2$. The purified AlN as it comes out of the bomb is ground to about 50 mesh or smaller and is placed in an Alundum boat which in turn is placed in a quartz tube. A drying agent, for instance, phosphor pentoxide is placed in the tube so that the gas must pass through or over it to reach the powdered aluminum nitride sample which is heated to about 800° C. The gas is passed over the heated aluminum nitride powder for about five minutes and then allowed to cool.

To 1 gram of the purified crystalline aluminum nitride which exhibits very little or no luminescence there is added about 0.1 gm. pure, dry magnesium chloride ($MgCl_2$) so that this mixture contains about 2% of magnesium as doping agent. This mixture is now again placed in an Alundum boat and heated in an inert atmosphere preferably nitrogen for about five minutes at temperatures of about 800° C. Then the tube is flushed with chlorine gas and the now doped AlN is again heated with chlorine gas at about 800° C. to remove the excess magnesium. The tube is then allowed to cool and $N_2$ is again introduced at about the same temperature (800° C.) for about five minutes to remove the $Cl_2$ gas from AlN.

The resulting AlN powder is a blue electroluminescent material. It has been observed in some cases that the doped AlN powder, if heated to a higher temperature than that mentioned above, the electroluminescence changes to red.

*Example 2*

One gm. of powdered crystalline AlN is prepared and purified as described in Example 1 and then intimately mixed with one tenth of a gm. of $MnO_2$ or $MnC_2O_4$ and this mixture is placed as described in Example 1 in an Alundum boat which in turn is placed in a quartz or Alundum tube. An inert gas like nitrogen is first passed over a drying agent and then over the sample. The sample is heated to about 800° C. for five minutes. When the sample has cooled a halogen gas, e.g., $Cl_2$ is introduced in place of the $N_2$ and the sample is again heated to about 800° C. for about five minutes, in order to remove the excess doping agent. The tube is allowed to cool and $N_2$ is again introduced and the sample heated again to 800° C. for about five minutes in order to remove the $Cl_2$ gas.

The resulting product has a bright green, yellow or red electroluminescence. When excited with ultra-violet light aluminum nitride made according to this example shows a bright blue or red luminescence.

*Example 3*

One gm. or powdered crystalline AlN prepared and purified as described in Example 1 is intimately mixed with one tenth of a gram of chromium chloride ($CrCl_3$) and the mixture is heated in nitrogen at 800° C. for about five minutes as described in Examples 1 and 2. After cooling chlorine is used to replace the nitrogen and the mixture is again heated for about five minutes at 800° C. in order to remove the excess $CrCl_3$. The tube is then allowed to cool and $N_2$ is again introduced at about the same temperature of 800° C. for a short time to remove the $Cl_2$ from the aluminum nitride which is now doped with $CrCl_3$ and shows a red electroluminescence.

Electroluminescent AlN made according to this invention can also be excited by cathode rays, X-rays, gamma rays, etc.; it shows improved brightness, life and efficiency and may therefore be used to great advantage in electroluminescent lamps, display panels for radar, cathode ray tubes, light amplification devices, ultra-violet detectors, X-ray intensifiers, instrument panels, dashboard lighting, etc. Electroluminescent AlN made according to this invention may be embedded in a plastic or ceramic dielectric or sandwiched between two conductive layers at least one of which is translucent.

Both A.C. and D.C. may be applied as the power source; with a D.C. power source, a power consumption of only one tenth of a watt provides light which is visible in a fully lighted room.

The new electroluminescent aluminum nitride made according to this invention shows the following advantages over presently known materials. It possesses very high chemical stability, the raw material is readily available and of low cost, and the power consumption extremely low while the lighting efficiency is very high.

What is claimed is:

1. A method of producing electroluminescent aluminum nitride comprising preparing crystalline aluminum nitride by reacting powdered aluminum of high purity with dry nitrogen under high pressure and temperature, purifying the resulting crystalline aluminum nitride in powdered form by passing a dry halogen gas over it at temperatures of about 300 to 1500° C., doping the purified crystalline aluminum nitride with a doping agent in amounts slightly in excess of the amount which is capable of imparting to said aluminum nitride electroluminescent properties said doping agent being selected from the group consisting of magnesium, manganese, beryllium, zinc, cadmium, copper, silver, carbon, silicon, germanium, tin, lead, iron, cobalt, nickel, sulfur and their respective chemical compounds and again heating the doped aluminum nitride in the presence of a halogen gas to temperatures of between about 300 to 1500° C.

2. A method of producing electroluminescent aluminum nitride according to claim 1 in which magnesium is used as the doping agent.

3. A method of producing electroluminescent aluminum nitride according to claim 1 in which manganese is used as the doping agent.

4. A method of producing electroluminescent aluminum nitride according to claim 1 in which chromium is used as the doping agent.

5. A method of producing electroluminescent aluminum nitride according to claim 1 in which the doping agent added to the purified, powdered aluminum nitride consists of magnesium chloride.

6. A method of producing electroluminescent aluminum nitride according to claim 1 in which the doping agent added to the purified, powdered aluminum nitride consists of manganese oxalate.

7. A method of producing electroluminescent aluminum nitride according to claim 1 in which the doping agent added to the purified aluminum nitride consists of chromium chloride.

8. A method of producing electroluminescent aluminum nitride according to claim 1 in which said halogen gas consists of chlorine.

9. A method of producing electroluminescent aluminum nitride according to claim 1 in which said powdered aluminum used for the manufacture of aluminum nitride has a purity of at least 99.99%.

10. A method of producing electroluminescent aluminum nitride according to claim 1 in which the aluminum nitride is powdered to a particle size of smaller than 50 mesh before purification by said dry halogen gas.

11. A method of producing electroluminescent aluminum nitride according to claim 1 in which the aluminum nitride is purified in powdered form by passing chlorine gas over it at temperatures of about 800° C. whereupon the purified crystalline aluminum nitride is doped with an excess of magnesium chloride in a nitrogen atmosphere for about five minutes at temperatures of about 800° C.

12. A method of producing electroluminescent aluminum nitride according to claim 1 in which the aluminum nitride is purified in powdered form by passing chlorine gas over it at temperatures of about 800° C. whereupon the purified crystal aluminum nitride is doped with an excess of manganese oxalate in a nitrogen atmosphere for about five minutes at temperatures of about 800° C.

13. A method of producing electroluminescent aluminum nitride according to claim 1 in which the aluminum nitride is purified in powdered form by passing chlorine gas over it at temperatures of about 800° C. whereupon the purified crystal aluminum nitride is doped with an excess of chromium chloride in a nitrogen atmosphere for about five minutes at temperatures of about 800° C.

References Cited in the file of this patent

FOREIGN PATENTS

| | | |
|---|---|---|
| 1,162,795 | France | Apr. 14, 1958 |
| 739,390 | Germany | Sept. 24, 1943 |

OTHER REFERENCES

Berichte der Dtsch. Chem. Gesellschaft 61 (1928), pp. 1568–1573.

Kroger: "Some Aspects of Luminescence of Solids," Elsevier Pub. Co., N.Y. (1948), pp. 278 and 270.

Mellor: Comprehensive Treatise on Inorganic and Theoretical Chemistry, vol. 8, Longmans, Green and Co., N.Y., 1928, page 111.